(12) United States Patent
Park et al.

(10) Patent No.: US 7,869,433 B2
(45) Date of Patent: Jan. 11, 2011

(54) HOME NETWORK CONNECTION MANAGEMENT SYSTEM USING UPNP AND VLAN MULTICAST

(75) Inventors: Jun-Hee Park, Daejon (KR);
Dong-Hwan Park, Daejon (KR);
Dong-Hee Kim, Daejon (KR);
Kyeong-Deok Moon, Daejon (KR);
Kwang-Il Lee, Daejon (KR)

(73) Assignees: Electronics and Telecommunications Research Institute, Daejon (KR); The Industry & Academic Cooperation in Chungnam National University, Daejon (KR)

( * ) Notice: Subject to any disclaimer, the term of this patent is extended or adjusted under 35 U.S.C. 154(b) by 408 days.

(21) Appl. No.: 11/485,801

(22) Filed: Jul. 13, 2006

(65) Prior Publication Data

US 2007/0071012 A1 Mar. 29, 2007

(30) Foreign Application Priority Data

Sep. 29, 2005 (KR) ............. 10-2005-0091611
Feb. 6, 2006 (KR) ............. 10-2006-0011102

(51) Int. Cl.
*H04L 12/28* (2006.01)
*H04L 12/56* (2006.01)
(52) U.S. Cl. ............... 370/390; 370/216; 370/248
(58) Field of Classification Search ............. 370/389, 370/390
See application file for complete search history.

(56) References Cited

U.S. PATENT DOCUMENTS 4,864,559 A * 9/1989 Perlman .............. 370/256
5,511,168 A * 4/1996 Perlman et al. ........ 709/243
5,959,989 A * 9/1999 Gleeson et al. ........ 370/390

(Continued)

FOREIGN PATENT DOCUMENTS

KR 1020000059683 A 10/2000

(Continued)

OTHER PUBLICATIONS

'Inter Bridge VLAN Registration Protocol for IP Subnet VLAN' Kok et al., Multimedia University, Malaysia and Bell Labs, Lucent Technologies, Holmdel, NJ, 2000 IEEE, pp. 520-521.

(Continued)

*Primary Examiner*—Daniel Wu
*Assistant Examiner*—Frederick Ott
(74) *Attorney, Agent, or Firm*—Ladas & Parry LLP

(57) ABSTRACT

Provided is a home network connection management system using UPnP (Universal Plug and Play) and VLAN (Virtual LAN) multicast. The home network connection management system includes a UPnP-VLAN interfacing section for receiving requests of registration of VLAN and multicast addresses from a UPnP device in response to connection establishment commands from a connection manager, a VLAN managing section for registering the VLAN and multicast addresses in a VLAN mapping table according to connection establishment request from the UPnP device through the UPnP-VLAN interfacing section, the VLAN mapping table for matching and storing the VLAN and multicast addresses under the control of the VLAN managing section, and an Ethernet device driver for retrieving the VLAN and multicast addresses from the VLAN mapping table in response to TCP/IP data from an outside, forming the received TCP/IP data into VLAN frames, and transmitting the VLAN frames.

4 Claims, 3 Drawing Sheets

U.S. PATENT DOCUMENTS

| | | | |
|---|---|---|---|
| 6,785,272 B1* | 8/2004 | Sugihara | 370/386 |
| 6,873,602 B1* | 3/2005 | Ambe | 370/254 |
| 2002/0078161 A1* | 6/2002 | Cheng | 709/208 |
| 2005/0157730 A1* | 7/2005 | Grant et al. | 370/401 |
| 2006/0004939 A1* | 1/2006 | Edwards et al. | 710/302 |

FOREIGN PATENT DOCUMENTS

| | | |
|---|---|---|
| KR | 1020020023100 A | 3/2002 |
| KR | 1020040088847 A | 10/2004 |
| KR | 1020050058624 A | 6/2005 |
| KR | 1020050066937 A | 6/2005 |

OTHER PUBLICATIONS

IGMP Snooping: A VLAN-Based Multicast Protocol, Wang et al., Institute of Software, Chinese Academy of Sciences, 2002 IEEE, pp. 335-340.

* cited by examiner

HOME NETWORK CONNECTION MANAGEMENT SYSTEM USING UPNP AND VLAN MULTICAST

FIELD OF THE INVENTION

The present invention relates to a home network connection management system, and more particularly, to a home network connection management system using Universal Plug and Play (UPnP) and Virtual LAN (VLAN) multicast for establishing and controlling VLAN and multicast traffic using a host and a bridge (or switch) supporting UPnP under a LAN environment.

DESCRIPTION OF RELATED ART

Due to increase of user requirements with the advance of home network technologies, a need has also increased for establishment of a ubiquitous environment within the home network in the recent years. In order to provide the ubiquitous environment within the home network, there are required mobility of devices within the home network, mobility of service related documents allowing services to be offered successively from various devices, and a technique capable of providing data simultaneously from one or more devices.

Generally, since a home network has a multiple LAN configuration with a single Internet Protocol (IP) subnet, a technique that can provide the above-described requirements on a LAN, not on a Transmission Control protocol (TCP)/IP or an application program, is inevitably needed. Also, an interlocking technique between protocol and middleware is required for compatibility between devices connected to heterogeneous network media.

UPnP is known as a typical home network middleware supporting various AV services; and is based on IP networking and defines its structure using protocols such as TCP, User Datagram Protocol (UDP), Hyper Text Transfer Protocol (HTTP), Extensible Markup Language (EML) and so on, which are widely used in the internet. This UPnP is utilized to configure a seamless network among devices using various media in a home network and also to add/remove each device to/from the network without user's or manager's efforts.

As described above, since the UPnP operates based on TCP/IP, it is allowed to operate regardless of inhomogeneous network or devices within the home network. It also recognizes and controls services provided by the devices within the home network, thus rendering the services provided.

Meanwhile, a VLAN (IEEE 802.1q), which is defined as a logical concept, divides a LAN into a plurality of LAN segments regardless of a physical connection status and makes it possible to communicate between the segments. In addition, the VLAN is a technique that allows various Quality of Services (QoSs) to be offered in the LAN. Now, description will be given on a configuration of a conventional home network in which UPnP devices and a switch are connected via Ethernets, referring to FIG. 1.

FIG. 1 is an exemplary block diagram showing a configuration of a conventional home network.

As shown therein, the conventional home network has a structure that couples various UPnP devices and a switch (or a bridge) 104 through Ethernets 101 to 103. As mentioned early, the UPnP is a middleware that is based on TCP/IP and those UPnP devices are typically coupled by way of LAN media 101 to 103 such as the Ethernet.

For example, if an application service is based on unicasting, a bridge 104 makes a switching to an Ethernet address of a destination, not to an IP or TCP (or UDP) address of the destination. Otherwise, if the service is based on multicasting, the bridge broadcasts received multicast traffic to all LANs.

However, this multicasting-based application service causes a heavy load to bring about in the interior of the LAN. Although the filtered multicasting as recommended by IEEE 802.1d can currently identify each group address, only a portion of the multicast traffic can be filtered. Accordingly, there is in urgent need of a scheme that can identify each service and effectively manage traffic to meet each service trend so that the bridge can provide services suitable for the application services.

SUMMARY OF THE INVENTION

It is, therefore, an object of the present invention to provide a home network connection management system using UPnP and VLAN multicast for establishing and controlling VLAN and multicast traffic using a host and a bridge (switch) supporting UPnP under a LAN environment.

In accordance with an aspect of the present invention, there is provided a home network connection management system using UPnP and VLAN multicast, including: a UPnP-VLAN interfacing section for receiving requests of registration of VLAN and multicast addresses from a UPnP device in response to connection establishment commands from a connection manager; a VLAN managing section for registering the VLAN and multicast addresses in a VLAN mapping table based on connection establishment requests provided from the UPnP device through the UPnP-VLAN interfacing section; the VLAN mapping table for matching and storing the VLAN and multicast addresses under the control of the VLAN managing section; and an Ethernet device driver for retrieving the VLAN and multicast addresses from the VLAN mapping table in response to receipt of TCP/IP data from an outside, forming the received TCP/IP data into VLAN frames, and transmitting the VLAN frames.

The home network connection management system further includes a GARP processor for dynamically registering/releasing VLAN IDs and multicast group addresses to/from an adjacent switch using GARP when a portion of adjacent nodes within the home network do not support UPnP.

In accordance with another aspect of the present invention, there is provided a home network connection management system using UPnP and VLAN multicast, including: a UPnP-VLAN interfacing section for acquiring connection information from a UPnP device; a VLAN managing section for storing VLAN and multicast addresses necessary for switching in a filtering database based on the connection information acquired through the UPnP-VLAN interfacing section and managing the stored VLAN and multicast addresses; the filtering database for storing the VLAN and multicast addresses under the control of the VLAN managing section; and an Ethernet device driver for performing the switching by using the filtering database in response to receipt of TCP/IP data from an outside.

The home network connection management system further includes a GARP processing means for dynamically registering/releasing a portion of adjacent nodes using GARP when the corresponding adjacent nodes do not support UPnP.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

The above-mentioned objectives, features, and advantages will be more apparent by the following detailed description in association with the accompanying drawings; and thus, the invention will be readily conceived by those skilled in the art to which the invention pertains. Further, in the following description, well-known arts will not be described in detail if it seems that they could obscure the invention in unnecessary detail. Hereinafter, preferred embodiments of the present invention will be set forth in detail with reference to the accompanying drawings.

Figure 1:
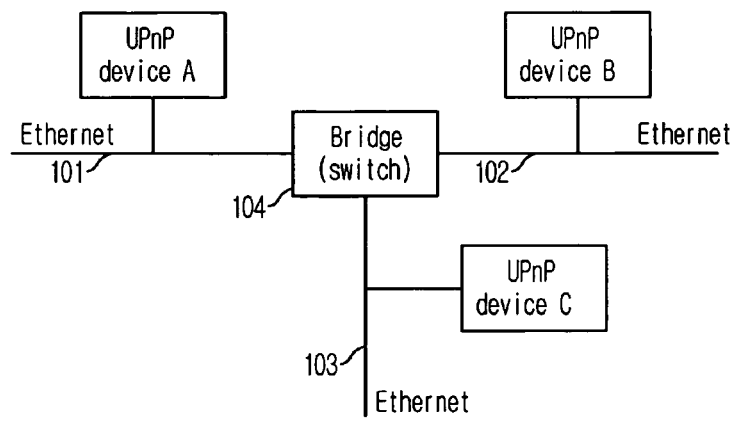
FIG. 1 is a block diagram showing a configuration of a conventional home network.
Figure 2:
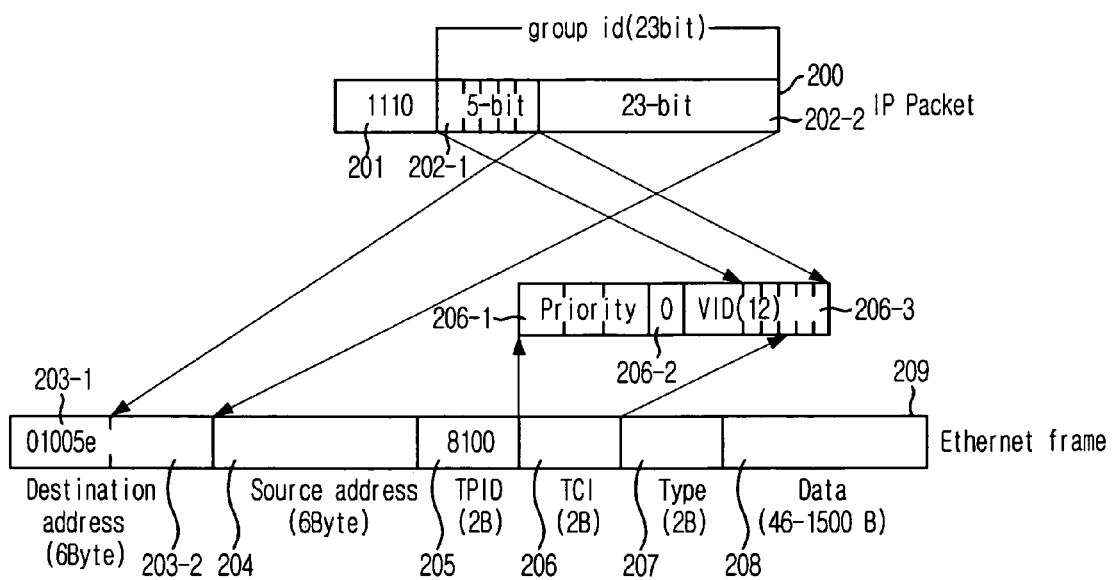
FIG. 2 is a view for describing a procedure of converting an IP packet group address into a VLAN and an Ethernet multicast address in a home network connection management system using UPnP and VLAN multicast in accordance with an embodiment of the present invention.

FIG. 2 is a view for describing a procedure of converting an IP packet group address into a VLAN and an Ethernet multicast address in a home network connection management system using UPnP and VLAN multicast in accordance with an embodiment of the present invention.

Referring to FIG. 2, a value 1110 of the upper 4 bits 201 of the IP packet indicates a multicast address while the lower 28 bits 202 indicate a multicast identifier. Here, the lower 23 bits 202-2 among the 28 bits identifier is mapped to an Ethernet multicast address 203-2. In the embodiment of the present invention, the upper 5 bits 202-1, which are generally discarded, are mapped to the lower bits 206-3 of the VLAN address in order to identify the IP multicast address accurately.

Figure 3:
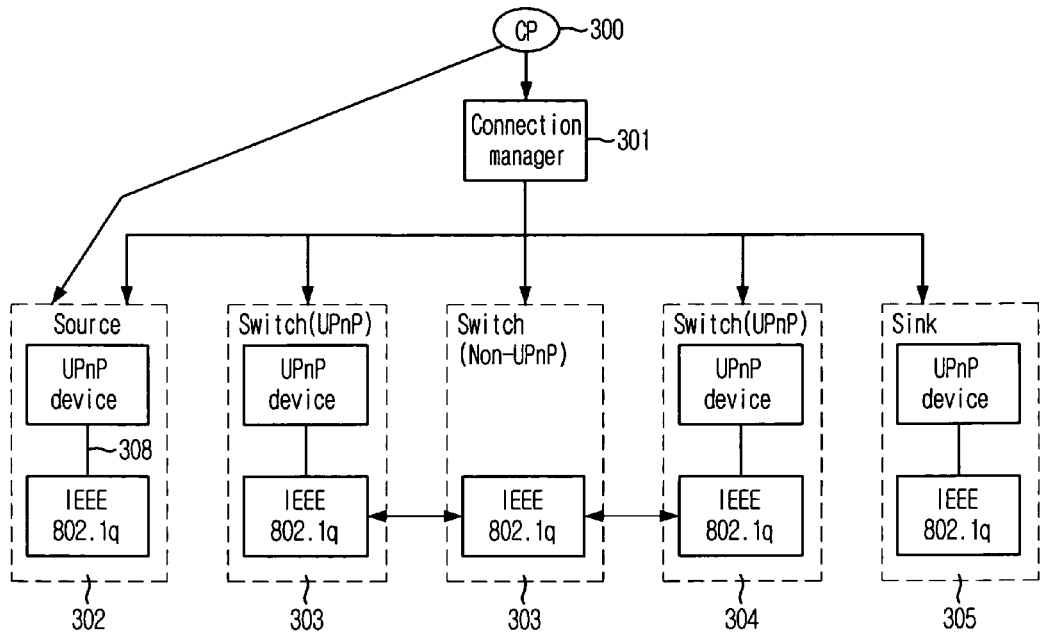
FIG. 3 is an exemplary block diagram illustrating an embodiment of a UPnP system to which the present invention is applied.

FIG. 3 is an exemplary block diagram illustrating an embodiment of a UPnP system to which the present invention is applied. Referring to FIG. 3, the UPnP system includes a Control Point (CP) 300, a Connection Manager (CM) 301, a UPnP device 302 and a non-UPnP device 303.

If the CP 300 requests a service to the CM 301 existed in a home, the CM 301 calculates a path between a transmitter and a receiver of the requested service and then makes a command to establish a connection via all UPnP devices 302 to 305 on the path.

Then, the UPnP devices 302 to 305 register VLAN and multicast addresses through an interface of IEEE 802.1q or through interlocking between the UPnP devices 302 to 305 in response to the connection establishment command. After completing the connection establishment, the CP 300 sends a command to start the service to the transmitter.

Figure 4:
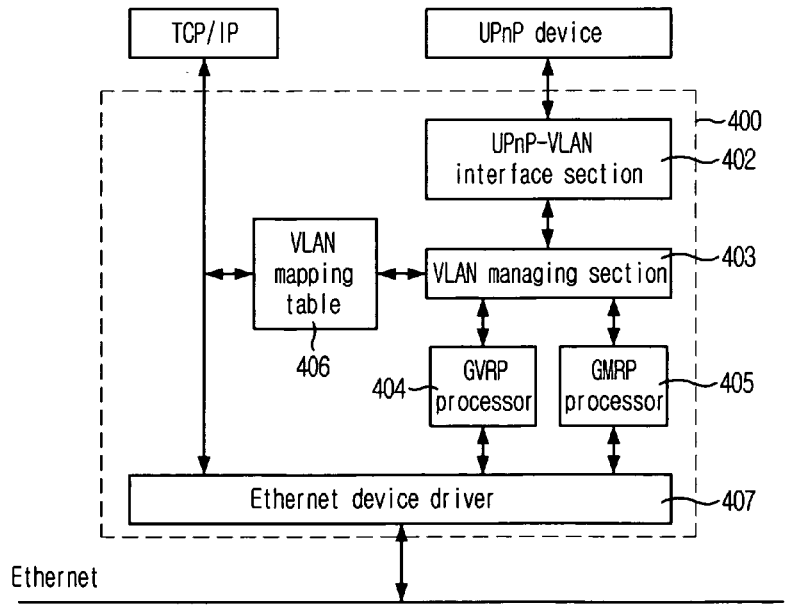
FIG. 4 is an exemplary block diagram illustrating a configuration of a home network connection management system using UPnP and VLAN multicast in accordance with an embodiment of the present invention.

FIG. 4 is an exemplary block diagram illustrating a configuration of a home network connection management system using UPnP and VLAN multicast in accordance with an embodiment of the present invention. In FIG. 4, the system manages connections at a node, i.e., a transmitter (server) or a receiver (client), located at a termination of a UPnP device.

As shown in FIG. 4, the connection management system 400 in accordance with an embodiment of the present invention includes a UPnP-VLAN interfacing section 402 for receiving requests for VLAN and multicast address registration from the UPnP device in response to connection establishment commands from the CM 301, a VLAN managing section 403 for registering the VLAN and multicast addresses in a VLAN mapping table 406 according to the connection establishment request from the UPnP device via the UPnP-VLAN interfacing section 402, the VLAN mapping table 406 for matching and storing the VLAN and multicast addresses under the control of the VLAN managing section 403, an Ethernet device driver 407 for forming received TCP/IP data into VLAN frames by retrieving the VLAN and multicast addresses from the VLAN mapping table 406 in response to receipt of TCP/IP data from an outside and transmitting them, and a Generic Attribute Registration Protocol (GARP) VLAN Registration Protocol (GVRP) processor 404 and a GARP Multicast Registration Protocol (GMRP) processor 405 for dynamically registering/releasing VLAN IDs and multicast group address of an adjacent node that does not support UPnP within the home network, in/from an adjacent switch using GARP.

First of all, when the CM 301 issues the connection establishment command, a UPnP device located at each termination receives the connection establishment command.

Then, the UPnP device requests a registration of the VLAN and multicast addresses through the UPnP-VLAN interfacing section 402. The VLAN managing section 403 as defined in IEEE 802.1q manages the request.

The VLAN managing section 403 registers the VLAN and multicast addresses in the VLAN mapping table 406 according to the connection establishment request transferred from the UPnP device through the UPnP-VLAN interfacing section 402.

If all nodes in a home support UPnP, the VLAN registration process is over. However, if an adjacent node does not support UPnP, the VLAN managing section 403 registers the VLAN and multicast addresses in an adjacent switch through the GVRP processor 404 and the GMRP processor 405. The GVRP processor 404 and GMRP processor 405 are necessary in a case where a portion of the nodes in a home do not support UPnP.

The GVRP and GMRP protocols, as suggested by IEEE, are GARP applications for dynamically registering and releasing VLAN IDs and multicast group addresses within a LAN configured with IEEE 802.ID bridges.

The GARP is a protocol that provides a general framework that allows equipments, i.e., terminals and switches, within a bridge-LAN to register or delete specific attribute values such as VLAN IDs. For the above purpose, the attributes are transferred to the equipments inside the bridge-LAN and these equipments constitute an accessible tree, namely, a part-tree of an active topology. Generally, the active topology inside the bridge LAN is formed and maintained by Spanning-Tree Protocol (STP).

The GVRP protocol is a protocol for transmitting/receiving information of registration and release of the VLAN IDs between devices to change a configuration of the VLAN dynamically.

The GMRP protocol is a GARP application for providing a limited multicast flooding function such as Internet Group Management Protocol (IGMP) snooping, wherein a client is registered as a multicast member of a 2-layered switch.

When the VLAN registration procedure as described above is completed, the transmitter (server) transmits data through TCP/IP 400. Then, the Ethernet device driver 407 retrieves the VLAN and multicast addresses from the VLAN mapping table 406 and forms data received from the transmitter (server) into VLAN frames.

Figure 5:
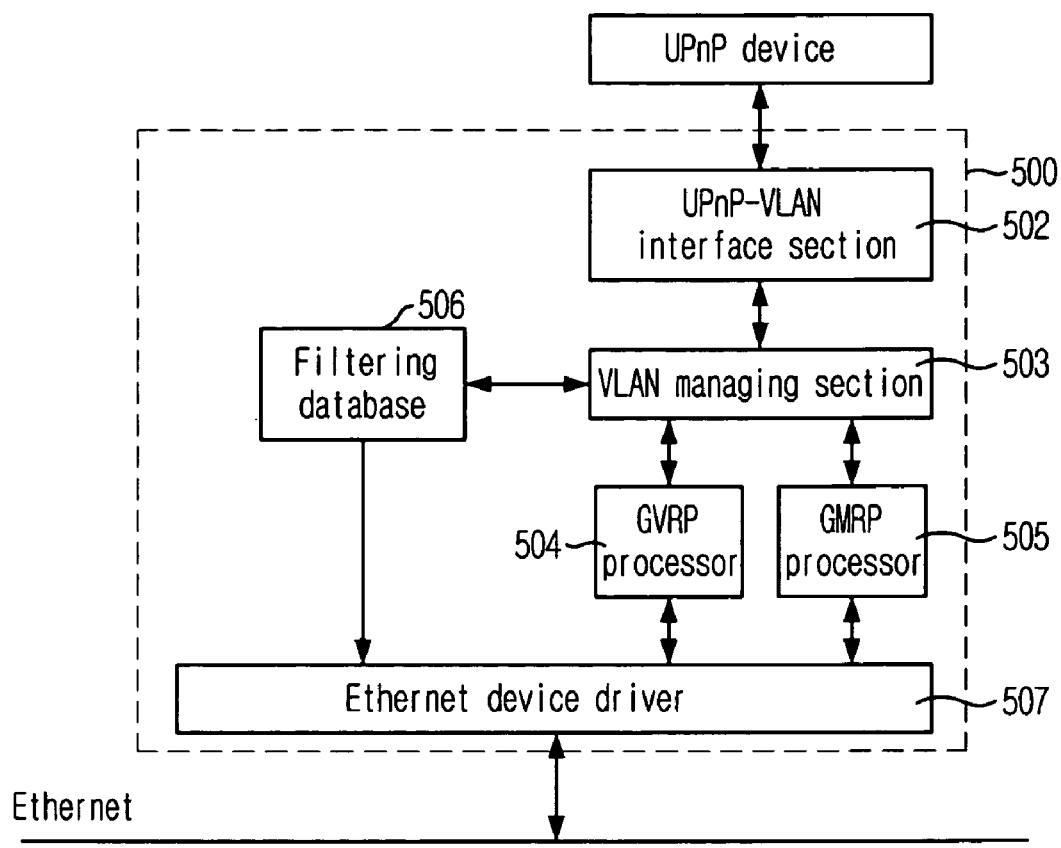
FIG. 5 is an exemplary block diagram illustrating a configuration of a home network connection management system using UPnP and VLAN multicast in accordance with another embodiment of the present invention.

FIG. 5 is an exemplary block diagram illustrating a configuration of a home network connection management system using UPnP and VLAN multicast in accordance with another embodiment of the present invention, in which a connection management is processed at a switch supporting UPnP.

As shown in FIG. 5, the connection management system 500 in accordance with another embodiment of the present invention includes a UPnP-VLAN interfacing section 502 for acquiring connection information from a UPnP device, a VLAN managing section 503 for storing VLAN and multicast addresses necessary for switching in a filtering database 506 according to connection information acquired through the UPnP-VLAN interfacing section 502 and managing the stored VLAN and multicast addresses, a filtering database 506 for storing the VLAN and multicast addresses by a control of the VLAN managing section 503, an Ethernet device driver 507 for performing the switching with reference to the filtering database in response to TCP/IP data from the outside, and a GVRP processor 504 and a GMRP processor 505 for dynamically registering/releasing a portion of adjacent nodes using GARP when the portion of the adjacent nodes do not support UPnP.

Differently from the connection management system 400 according to the embodiment the invention as described early, the connection management system 500 according to another embodiment of the invention includes the filtering database 506, rather than the VLAN mapping table 406. In other words, a switch does not generally generate data; and accordingly, the VLAN managing section 503 manages the filtering database 506 as defined in IEEE 802.1q using the connection information acquired through the UPnP-VLAN interfacing section 502.

The VLAN managing section 503 registers the VLAN and multicast addresses in an adjacent switch through the GVRP processor 504 and GMRP processor 505 when an adjacent node does not support UPnP.

The switch receives documents and performs switching therefor based on information of the filtering database 506. Similarly, the switch also conducts a connection establishment process with adjacent nodes through the GVRP processor 504 and GMRP processor 505 when the adjacent nodes do not support UPnP.

As set forth above, the connection management systems 400 and 500 in accordance with the embodiments of the present invention can dynamically register a VLAN in each switch (bridge) through only UPnP or through interlock with UPnP, GMRP and GVRP.

As a result, the present invention has advantages in that it can enable various application services provided within a home network interlocked with UPnP and also manage LAN resources effectively by establishing and controlling VLAN and multicast traffic using a host and a bridge (switch) supporting UPnP under a LAN environment.

The present application contains subject matter related to Korean patent application No. KR 2005-0091611, and KR 2006-0011102, filed with the Korean Intellectual Property Office on Sep. 29, 2005, and Feb. 6, 2006, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A home network connection management system using Universal Plug and Play (UPnP) and Virtual LAN (VLAN) multicast, comprising:

a UPnP-VLAN interfacing unit for receiving requests of registration of VLAN and multicast addresses from a UPnP device in response to connection establishment commands from a connection manager;

a VLAN managing unit for registering a VLAN ID and a multicast IP group address in a VLAN mapping table based on connection establishment requests provided from the UPnP device through the UPnP-VLAN interfacing unit;

the VLAN mapping table for matching and storing the VLAN ID and multicast IP group address under the control of the VLAN managing unit;

an Ethernet device driving unit for retrieving the VLAN ID and multicast IP group address from the VLAN mapping table in response to receipt of Transmission Control protocol/Internet Protocol (TCP/IP) data sent from a server, forming the received TCP/IP data into VLAN frames, and transmitting the VLAN frames, and a Generic Attribute Registration Protocol (GARP) processing unit for dynamically registering/releasing a VLAN ID and multicast IP group addresses in/from an adjacent switch using GARP when the portion of adjacent nodes within the home network do not support UPnP.

2. The home network connection management system as recited in claim 1, wherein the GARP processing unit comprises:

a GARP VLAN Registration Protocol (GVRP) processing unit for transmitting/receiving information of registration or deletion of the VLAN ID to/from a corresponding node using GVRP to dynamically change a configuration of the VLAN; and a GARP Multicast Registration Protocol (GMRP) processing unit for registering a corresponding node as a multicast member of the adjacent switch using GMRP.

3. The home network connection management system as recited in claim 1, wherein the Ethernet device deriving unit converts a group address of TCP/IP packets into the VLAN ID and Ethernet multicast addresses in such a way that lower 23 bits among a 28 bit identifier of a TCP/IP packet are mapped to an Ethernet multicast address and upper 5 bits are mapped to lower bits of the VLAN address for identifying an IP multicast address accurately.

4. The home network connection management system as recited in claim 3, wherein the home network connection management system is provided at a termination of the UPnP device.

* * * * *